(12) United States Patent
Madison et al.

(10) Patent No.: US 9,324,347 B2
(45) Date of Patent: Apr. 26, 2016

(54) APPARATUS AND METHOD FOR CONTROLLING TAPE MOVEMENT IN A ROTARY HEAD DATA STORAGE SYSTEM AND RETRIEVAL SYSTEM

(71) Applicant: ORACLE INTERNATIONAL CORPORATION, Redwood City, CA (US)

(72) Inventors: Carl T. Madison, Windsor, CO (US); Timothy C. Ostwald, Boulder, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 181 days.

(21) Appl. No.: 13/622,607

(22) Filed: Sep. 19, 2012

(65) Prior Publication Data

US 2014/0078874 A1    Mar. 20, 2014

(51) Int. Cl.
*G11B 5/584* (2006.01)
*G11B 5/09* (2006.01)
(Continued)

(52) U.S. Cl.
CPC ............ *G11B 5/584* (2013.01); *G11B 5/00813* (2013.01); *G11B 5/00817* (2013.01);
(Continued)

(58) Field of Classification Search
CPC .......... G02B 7/00; G02B 7/003; G02B 7/005; G02B 7/02; G02B 7/021; G02B 7/022; G02B 7/14; G02B 7/0031; G02B 26/108; G11B 7/0031; G11B 7/08; G11B 7/082; G11B 7/083; G11B 7/085; G11B 7/0901; G11B 7/0925; G11B 7/0927; G11B 7/093; G11B 5/584; G11B 7/08529; G11B 7/08582; G11B 7/0929; G11B 7/12; G11B 20/10; G11B 21/088; G11B 21/103; G11B 23/0007; G11B 5/0086; G11B 5/02; G11B 5/09; G11B 5/53; G11B 5/5504; G11B 7/09

USPC ...................... 360/88, 90–96.3, 78.02–78.15, 360/251.2–251.5, 260–261.1, 241–241.3, 360/70, 72.3, 77.02, 83–85, 360/130.21–130.24; 369/53.28, 13.37, 369/44.17–44.18, 44.11, 44.13

See application file for complete search history.

(56) References Cited

U.S. PATENT DOCUMENTS 2,866,012 A    12/1958   Ginsburg et al.
4,970,707 A *  11/1990   Hara ..................... G11B 7/0031
                                           369/44.11

(Continued)

FOREIGN PATENT DOCUMENTS

DE    2022265 A1    11/1971
DE    2203840 A1    8/1973

(Continued)

OTHER PUBLICATIONS

Quadruplex Videotape—Widipedia, the Free Encyclopedia, Mar. 30, 2011, http://web.archive.org/web/20110330015248/http://en.wikipedia.org/wiki/Quadruplex_vid . . . Mar. 23, 2012, 3 Pages.

(Continued)

*Primary Examiner* — Dionne H Pendleton
(74) *Attorney, Agent, or Firm* — Brooks Kushman P.C.

(57) ABSTRACT

A method is provided for controlling movement of a tape in a data storage and retrieval system having a tape roller servo subsystem for controlling movement of a tape, and a head servo subsystem for controlling position of a head element mounted on a rotatable carriage unit. The method includes receiving, from the head servo subsystem, a head element position feedback signal at the tape roller servo subsystem; and controlling movement of the tape by the tape roller servo subsystem based, at least in part, on the head element position feedback signal.

20 Claims, 4 Drawing Sheets

(51) Int. Cl.
| | |
|---|---|
| G11B 20/10 | (2006.01) |
| G11B 5/53 | (2006.01) |
| G11B 7/09 | (2006.01) |
| G11B 15/18 | (2006.01) |
| G11B 7/003 | (2006.01) |
| G11B 21/10 | (2006.01) |
| G11B 5/008 | (2006.01) |

(52) U.S. Cl.
CPC ............... *G11B 5/53* (2013.01); *G11B 7/0031* (2013.01); *G11B 7/093* (2013.01); *G11B 7/0925* (2013.01); *G11B 15/1808* (2013.01); *G11B 5/0086* (2013.01); *G11B 21/103* (2013.01)

(56) References Cited

U.S. PATENT DOCUMENTS

| | | | | |
|---|---|---|---|---|
| 5,216,534 | A * | 6/1993 | Boardman et al. | 359/209.1 |
| 5,331,490 | A | 7/1994 | Richards et al. | |
| 5,343,338 | A | 8/1994 | Murata et al. | |
| 5,404,348 | A | 4/1995 | Terao et al. | |
| 5,450,228 | A | 9/1995 | Boardman et al. | |
| 5,465,243 | A | 11/1995 | Boardman et al. | |
| 5,519,554 | A | 5/1996 | Todd et al. | |
| 5,585,978 | A | 12/1996 | Rottenburg et al. | |
| 5,646,806 | A | 7/1997 | Griffith et al. | |
| 5,883,868 | A | 3/1999 | Iwanaga | |
| 5,889,744 | A | 3/1999 | Iwanaga | |
| 5,953,482 | A | 9/1999 | Suzuki et al. | |
| 6,061,199 | A | 5/2000 | Goker et al. | |
| 6,075,678 | A * | 6/2000 | Saliba | G11B 5/5504 360/261.3 |
| 6,075,759 | A | 6/2000 | Yanagawa et al. | |
| 6,088,183 | A | 7/2000 | Nelson | |
| 6,108,165 | A | 8/2000 | Maruyama et al. | |
| 6,141,312 | A | 10/2000 | Masters et al. | |
| 6,188,535 | B1 | 2/2001 | Lemke et al. | |
| 6,285,519 | B1 | 9/2001 | Goker | |
| 6,297,927 | B1 | 10/2001 | Rudi | |
| 6,304,397 | B1 * | 10/2001 | Ozue | G11B 5/0086 360/271.1 |
| 6,442,126 | B1 | 8/2002 | Marchant et al. | |
| 6,614,731 | B2 | 9/2003 | Ishii | |
| 6,661,616 | B2 | 12/2003 | Yasukochi | |
| 6,856,484 | B2 | 2/2005 | Johnson et al. | |
| 6,940,682 | B2 * | 9/2005 | Bui et al. | 360/77.12 |
| 7,050,265 | B2 | 5/2006 | Kondo et al. | |
| 7,062,682 | B2 | 6/2006 | Ozaki | |
| 7,133,262 | B1 | 11/2006 | Nayak | |
| 7,324,297 | B2 | 1/2008 | Evans et al. | |
| 8,014,246 | B2 | 9/2011 | Mahnad | |
| 8,077,566 | B2 | 12/2011 | Mahnad | |
| 8,174,950 | B2 | 5/2012 | Ritter et al. | |
| 8,225,339 | B1 | 7/2012 | Madison, Jr. et al. | |
| 8,780,682 | B2 * | 7/2014 | Madison et al. | 369/53.31 |
| 8,793,713 | B2 * | 7/2014 | Madison et al. | 720/672 |
| 8,869,179 | B2 | 10/2014 | Madison, Jr. et al. | |
| 8,897,113 | B2 | 11/2014 | Madison et al. | |
| 2003/0043498 | A1 * | 3/2003 | Johnson et al. | 360/77.12 |
| 2007/0047395 | A1 | 3/2007 | Skeeter et al. | |
| 2007/0047406 | A1 * | 3/2007 | Yamashita et al. | 369/47.38 |
| 2007/0143659 | A1 | 6/2007 | Ball | |
| 2007/0206477 | A1 | 9/2007 | Raniuk et al. | |
| 2007/0222096 | A1 | 9/2007 | Slafer | |
| 2011/0141863 | A1 * | 6/2011 | Mahnad | 369/44.13 |
| 2013/0235708 | A1 * | 9/2013 | Wilson | 369/44.14 |
| 2014/0063649 | A1 * | 3/2014 | Bui et al. | 360/77.12 |

FOREIGN PATENT DOCUMENTS

| | | |
|---|---|---|
| JP | 06290401 A | 10/1994 |
| JP | 07098828 A | 4/1995 |
| WO | 9202014 A1 | 2/1992 |
| WO | 0209099 A1 | 1/2002 |
| WO | 2007092785 A2 | 8/2007 |

OTHER PUBLICATIONS

Optical Disc Drive—Wikipedia, the Free Encyclopedia, Mar. 30, 2011, http://web.archive.org/web/20110330014920/http://en.wikipedia.org/wiki/Optical_disc_dri . . . Mar. 23, 2012, 4 Pages.

Helical Scan—Wikipedia, the Free Encyclopedia, Feb. 2, 2009, http://web.archive.org/web/20009020202092919/http://en.wikipedia.org/wiki/Helical_scan Mar. 23, 2012, 2 Pages.

Blu-ray Disc—Wikipedia, the Free Encyclopedia, Mar. 29, 2011, http://web.archive.org/web/20110329170657/http://en.wikipedia.org/wiki/Blu-ray_Disc, Mar. 23, 2012, 10 Pages.

PCT International Search Report dated Oct. 25, 2012, Application No. PCT/US2012/041996, Applicant Oracle International Corporation, 62 Pages.

Office Action for U.S. Appl. No. 13/670,688 Dated Oct. 23, 2013, 18 Pages.

Office Action for U.S. Appl. No. 13/670,712, Dated Oct. 4, 2013, 22 Pages.

Office Action for U.S. Appl. No. 13/670,744, Dated May 21, 2013, 19 Pages.

Final Office Action for U.S. Appl. No. 13/670,744, Dated Sep. 5, 2013, 17 Pages.

Notice of Allowance for U.S. Appl. No. 13/670,744, Dated Sep. 18, 2013, 11 Pages.

U.S. Office Action Dated Apr. 7, 2014, U.S. Appl. No. 14/127,028.

U.S. Notice of Allowance Dated Jul. 17, 2014, U.S. Appl. No. 14/127,028.

European Patent Office International Search Report and Written Opinion Dated Feb. 26, 2014, Application No. PCT/US2013/068660.

U.S. Notice of Allowance Dated Mar. 14, 2014, U.S. Appl. No. 13/670,688.

European Patent Office International Search Report and Written Opinion Dated Feb. 26, 2014, Application No. PCT/US2013/068489.

U.S. Final Office Action Dated Apr. 25, 2014, U.S. Appl. No. 13/670,712.

European Patent Office International Search Report and Written Opinion Dated Feb. 24, 2014, Application No. PCT/US2013/068646.

U.S. Notice of Allowance Dated Mar. 19, 2014, U.S. Appl. No. 13/670,744.

\* cited by examiner

APPARATUS AND METHOD FOR CONTROLLING TAPE MOVEMENT IN A ROTARY HEAD DATA STORAGE SYSTEM AND RETRIEVAL SYSTEM

TECHNICAL FIELD

The following disclosure relates to an apparatus and method for controlling tape movement in a data storage and retrieval system.

BACKGROUND

Typical tape data storage and retrieval methods involve recording or writing data in tracks running length-wise down the tape, as well as retrieving or reading such data tracks from the tape. A multiple stripe head is used to write and/or read many parallel tracks. Optical tape data storage and retrieval systems using laser heads may operate in a similar fashion.

U.S. Pat. No. 8,225,339, which is assigned to the assignee of the present application, discloses a system and method for data storage and retrieval unitizing a tape medium and a rotary head assembly. In one disclosed embodiment, the system includes a head that may be swept substantially perpendicularly across a tape while the tape is moved longitudinally past the moving head.

SUMMARY

A method is provided for controlling movement of a tape in a data storage and retrieval system having a tape roller servo subsystem for controlling movement of a tape, and a head servo subsystem for controlling position of a head element mounted on a rotatable carriage unit. The method includes receiving, from the head servo subsystem, a head element position feedback signal at the tape roller servo subsystem; and controlling movement of the tape by the tape roller servo subsystem based, at least in part, on the head element position feedback signal.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various configurations of data storage and retrieval systems and methods for operating such systems. Several specific embodiments are set forth in the following description and in FIGS. 1-7 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the Figures may be combined with one or more features illustrated in one or more other Figures to produce embodiments that are not explicitly illustrated or described. In addition, other embodiments may be practiced without one or more of the specific features explained in the following description.

With reference to FIGS. 1-7, a data storage and retrieval system and method utilizing a tape media and a rotary head assembly will be described. As explained below in detail, the system and method of the present disclosure may provide precise control of tape media movement to facilitate data recording and/or retrieval operations.

Figure 1:
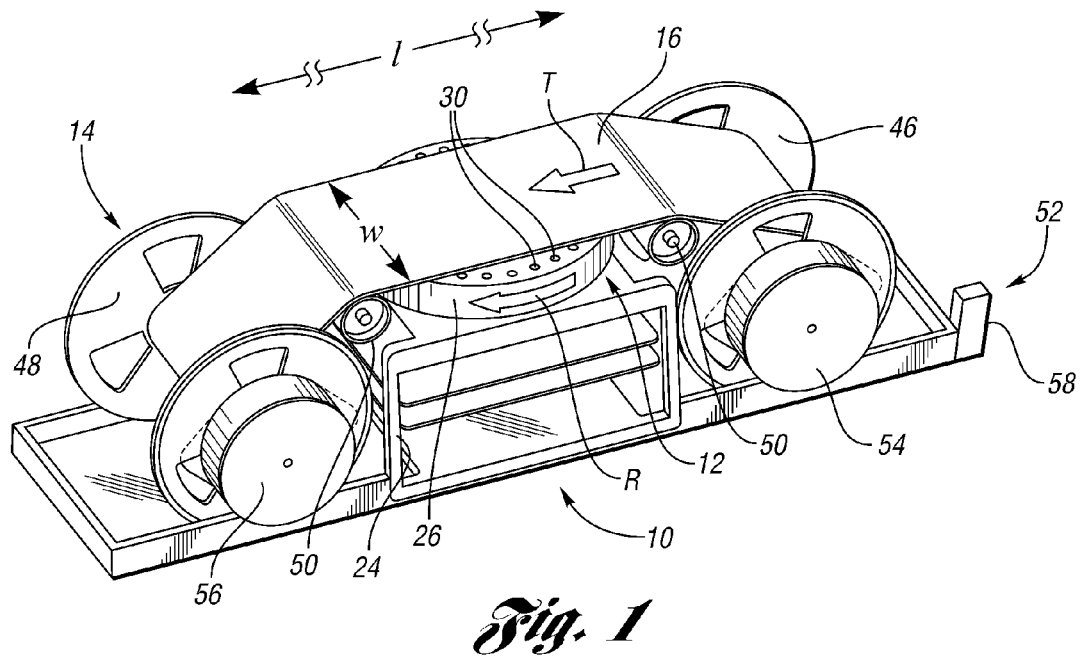
FIG. 1 is a perspective view of a data storage and retrieval system including a rotatable head assembly and a tape drive unit, wherein the head assembly includes a carriage unit and multiple head assemblies mounted on the carriage, and the tape drive unit is configured to move a tape past the head assembly.

Referring now to FIG. 1, a perspective view of an embodiment 10 of the data storage and retrieval system according to the present disclosures is shown, wherein the system 10 may be an optical recording and retrieval system. The system 10 includes a rotatable head assembly 12 and a tape drive unit 14 for moving a tape media, such as an optical tape 16, linearly past the head assembly 12 so that the head assembly 12 may perform write and/or read operations on the tape 16.

Referring to FIGS. 1-4, the head assembly 12 may be supported underneath the tape 16 by a spindle shaft 18, and may be driven to rotate by a head drive motor 20. Furthermore, the drive motor 20 may be at least partially built into the head assembly 12, for example. In that regard, passive rotor magnets 22 associated with the rotating head assembly 12 may be driven by commutation of stator coils (not shown) fixed in a base 24 of the system 10.

Figure 3:
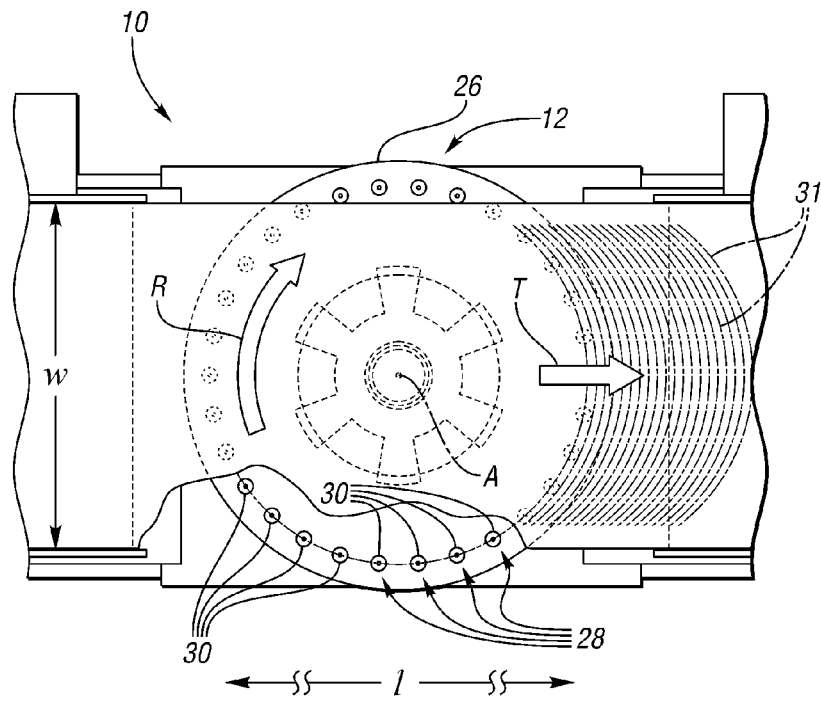
FIG. 3 is a top view of the data storage and retrieval system of FIG. 1.

The head assembly 12 includes a rotatable support member, such as a disk-shaped carriage unit 26, and multiple head units, such as optical path or pick-up units (OPU's) 28, mounted on the carriage unit 26. While 30 OPU's 28 are illustrated in FIG. 3, any suitable number of OPU's may be used. Furthermore, the OPU's 28 may be arranged in a substantially circular pattern on the carriage unit 26.

Each OPU 28 is configured to perform write and/or read operations on the tape 16 using, for example, optical beams or laser light. In that regard, each OPU 28 includes a head element, such as a primary lens or objective lens 30, that receives laser light from a laser element, such as a laser diode, and directs the laser light onto the tape 16 such that the OPU's 28 may transcribe data tracks of recorded spots in substantially similar approximate arcs 31 on the tape 16, and/or retrieve data from such data tracks, as the tape 16 moves past the head assembly 12. The arcs 31 are only approximate in radius since the movement of the tape 16 past the head assembly 12 will skew the data tracks recorded from true arcs to elongated arcs 31 in proportion to the speed of the rotating head assembly 12 and the speed of the moving tape 16.

Furthermore, each lens 30 is movable with respect to the carriage unit 26 to properly position and/or focus the laser light. For example, referring to FIG. 5, each lens 30 may be mounted on a support member, such as an arm 32, that is translatable and pivotable with respect to a main body or housing 33 of the respective OPU 28. With such a configuration, each lens 30 may move vertically relative to the respective housing 33 through translational movement of the arm 32, and also move radially relative to the respective housing 33 through pivotal movement of the arm 32. As another example, each OPU 28 may have any suitable configuration for moving the associated lens 30 vertically and/or radially with respect to the carriage unit 26.

Figure 5:
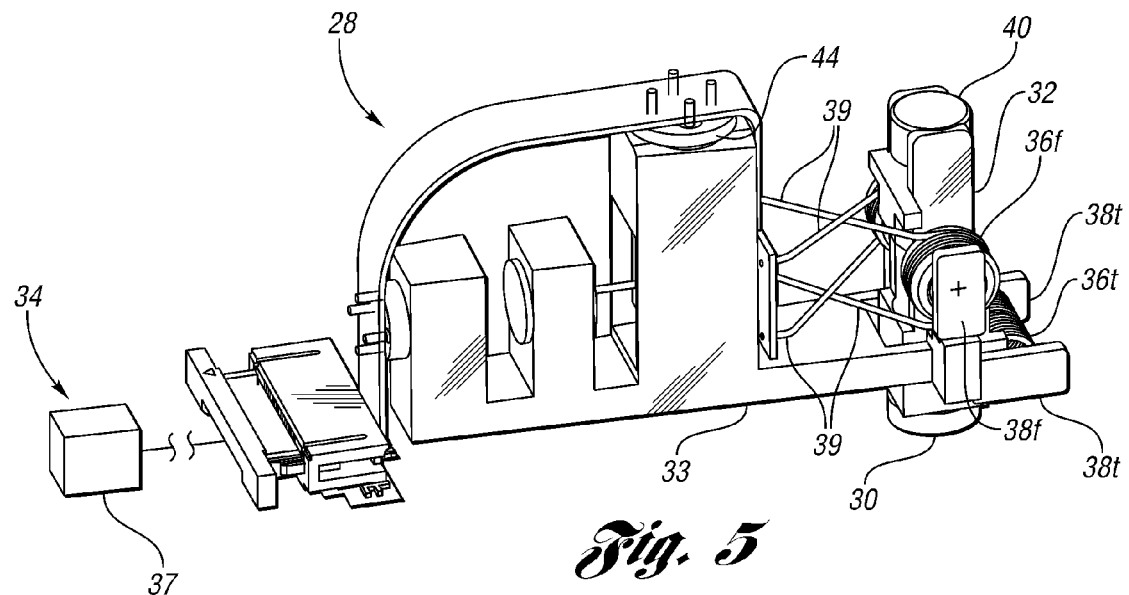
FIG. 5 is a perspective side view of a head unit of the head assembly, wherein the head unit includes a movable head element.

Still referring to FIG. 5, the head assembly 12 further includes multiple head servo subsystems, such as laser tracking servo subsystems 34, for controlling position of the lenses 30. Each laser tracking servo subsystem 34 includes one or more actuators 36 (identified as 36t and 36f in FIG. 5), such as motors and/or voice coils, for moving a respective lens 30, and a control arrangement, such as a lens tracking controller 37, for controlling operation of the actuators 36. The controllers 37 are operable to control the actuators 36 based on error or feedback signals as explained below, to thereby control position of the lenses 30 relative to the carriage unit 26. For example, each laser tracking servo subsystem 34 may be operable to vertically position and/or radially position a respective lens 30 with respect to the carriage unit 26.

Figure 6:
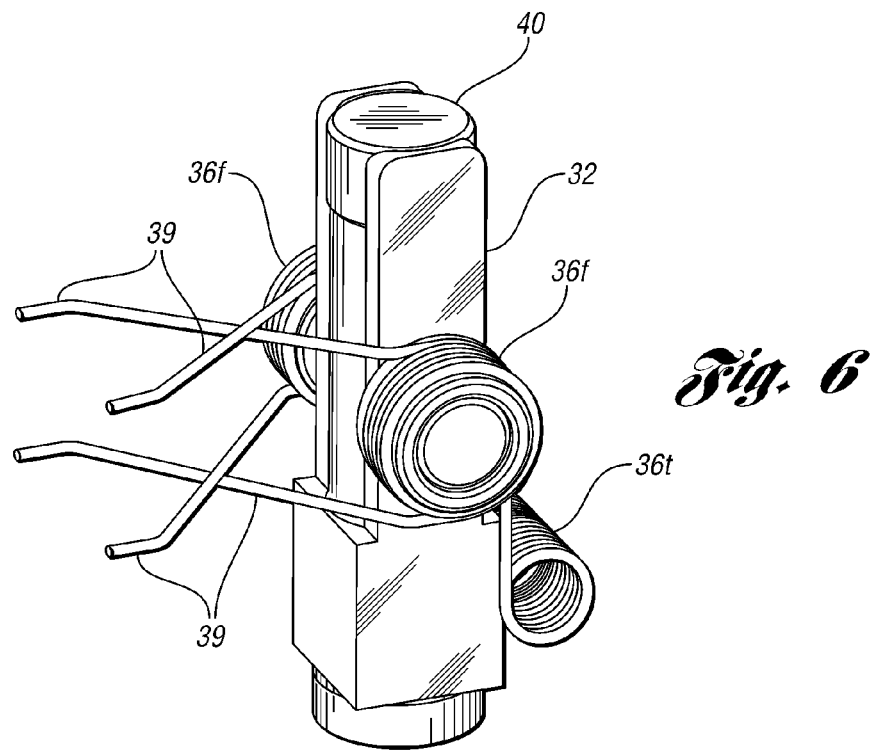
FIG. 6 is an enlarged perspective view of a portion of the head unit.

In the embodiment shown in FIGS. 5 and 6, the laser tracking servo subsystem 34 includes a tracking actuator 36t for pivoting the lens 30 and support arm 32 with respect to the housing 33 to thereby move the lens 30 radially relative to the carriage unit 26, and two focus actuators 36f for moving the lens 30 and support arm 32 vertically with respect to the housing 33. The tracking actuator 36t is movable with respect to permanent magnets 38t mounted on the housing 33, and the focus actuators 36f are each movable with respect to a permanent magnet 38f also mounted on the housing 33. Furthermore, one or more of the actuators 36t, 36f may include conductive, flexible positioning structures 39 that carry current for the actuators 36t, 36f. The positioning structures 39 may be fixedly connected to the housing 33 for supporting the support arm 32 on the housing 33, while allowing movement of the support arm 32 with respect to the housing 33. In the illustrated embodiment, a counterweight 40 is also provided on an end of the arm 32 to inhibit undesired pivotal movement that may result from rotational movement of the carriage unit 26, for example.

Figure 2:
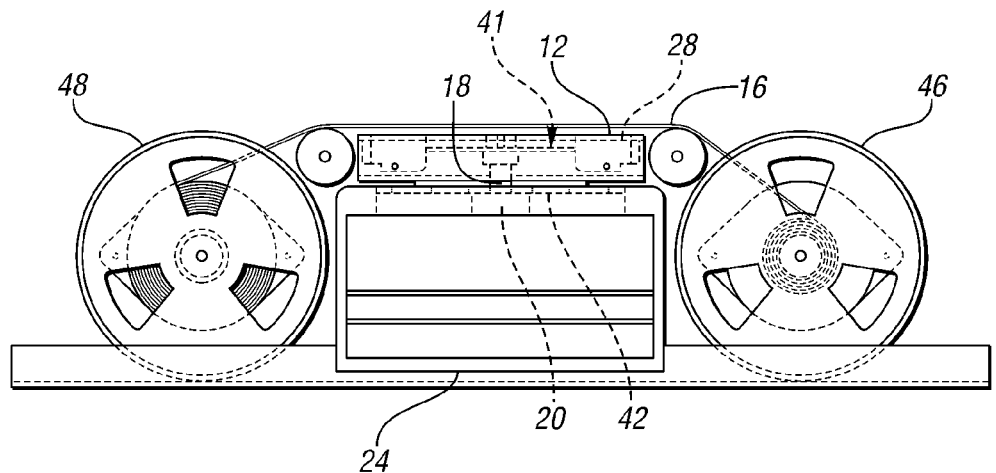
FIG. 2 is a side view of the data storage and retrieval system of FIG. 1.
Figure 4:
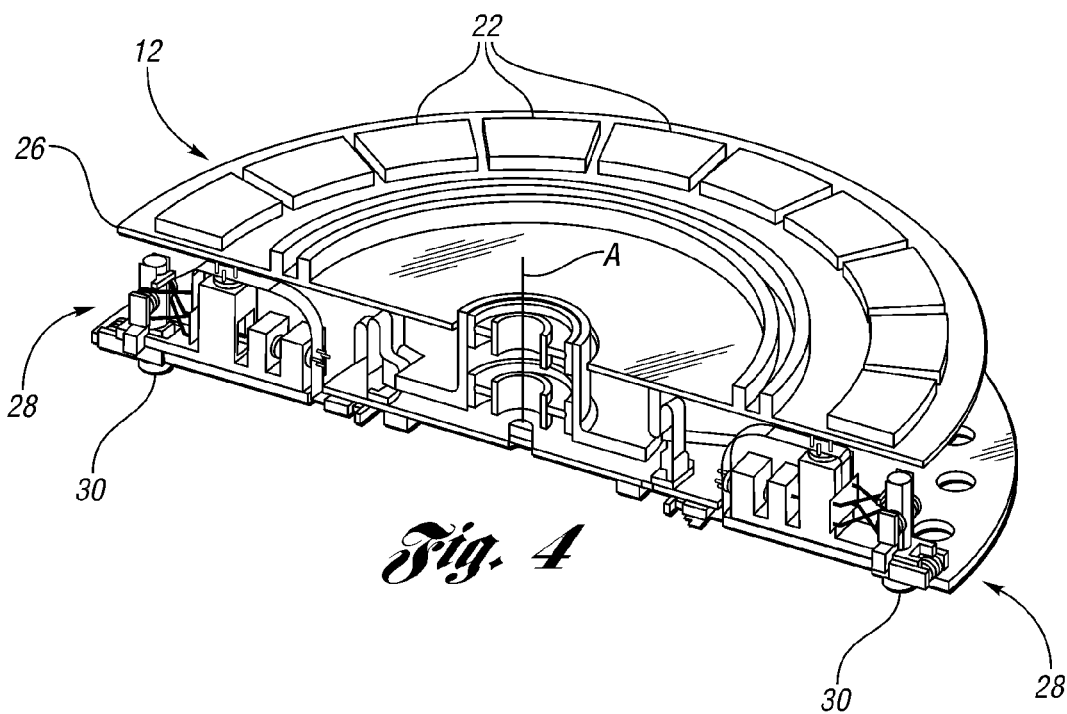
FIG. 4 is a cross-sectional bottom perspective view of the head assembly.

Referring to FIGS. 2 and 5, the controllers 37 may be mounted on or integrally formed with a head assembly circuit board 41. For example, multiple controllers 37 may be integrated into the circuit board 41 and provided as a single control arrangement. Furthermore, the controllers 37 and/or circuit board 41 may be configured to control other functions of the OPU's 28, as well as data communication. Power may be supplied to the head circuitry 41 through an inductive coupling 42, and data signals to and from the OPU's 28 may be sent through the inductive coupling 42.

Figure 7:
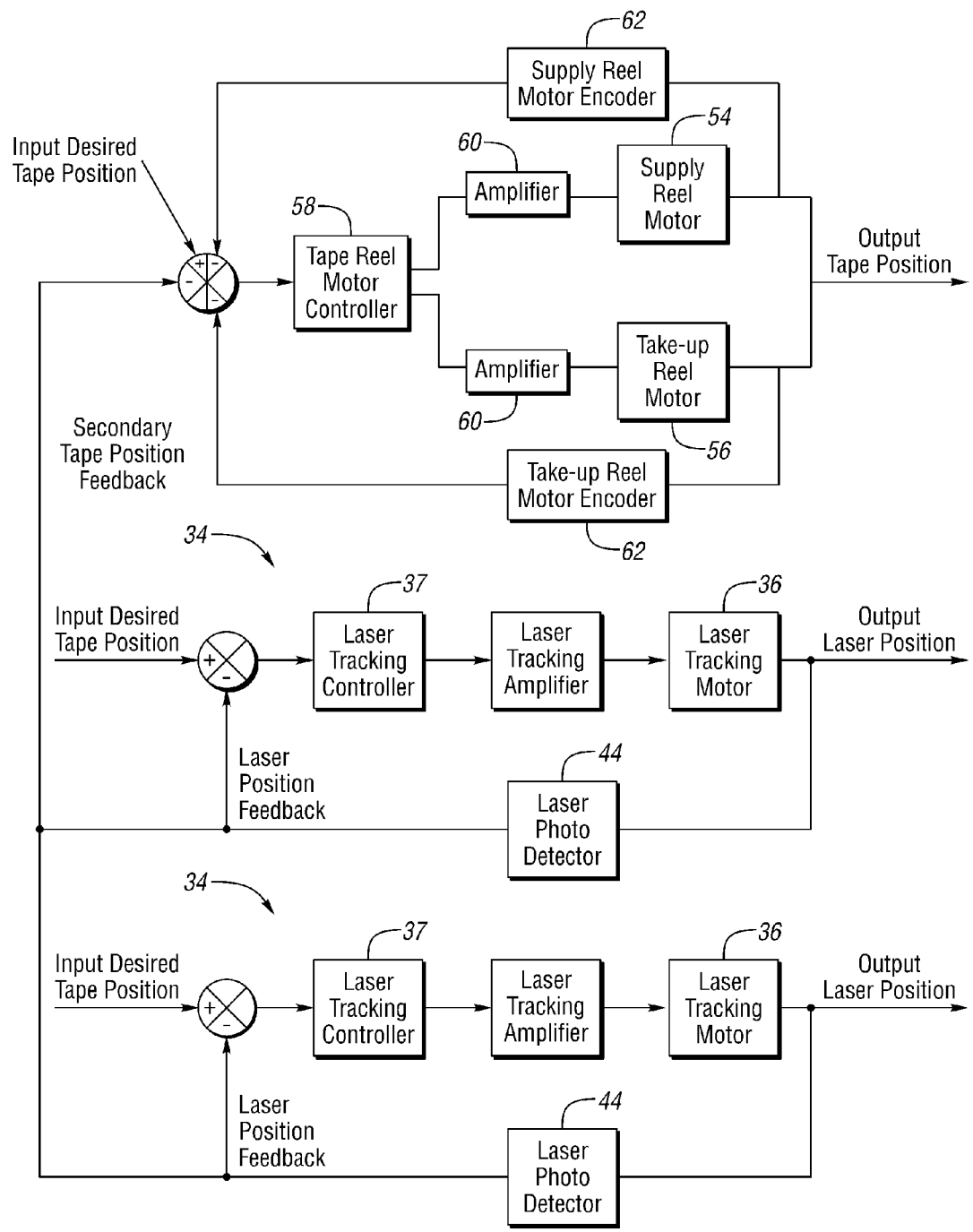
FIG. 7 is a flowchart showing operation of servo subsystems for controlling movement of the head element and the tape.

Referring to FIGS. 5 and 7, each laser tracking servo subsystem 34 further includes a feedback detector, such as a photo diode array sensor or photo detector 44, that is configured to generate a position error or feedback signal for the associated lens 30. For example, each photo detector 44 may be configured to detect laser light that is reflected off of the tape 16, and to generate a voltage signal that is indicative of the position of the associated lens 30 or reflected laser spot with respect to a prerecorded track or series of spots on the tape 16, such as a wobble track or servo track (e.g., an undulating, non-linear tracking pattern). The lens position feedback signals for a particular lens 30 may be used in a control loop of the associated laser tracking servo subsystem 34, such that the associated controller 37 may control position of the lens 30 based, at least in part, on the lens position feedback signals.

It should be noted that each laser tracking servo subsystem 34, or components thereof, may be considered part of the associated OPU 28. For example, the actuators 36 and photo detector 44 of a respective laser tracking servo subsystem 34 may be considered part of the associated OPU 28.

Returning to FIGS. 1 and 2, the tape drive unit 14 may include one or more tape rollers for moving the tape 16 in a direction T (orthogonal to tape width w and parallel to tape length 1) along a tape path and over or across the head assembly 12, as the head assembly 12 rotates in a direction R about an axis A that is generally orthogonal to the tape 16 and direction T. For example, the tape drive unit 14 may include a tape supply reel 46 for supplying the tape 16, a tape take-up reel 48 on which the tape 16 may be wound, and one or more guide rollers and/or tensioning rollers, such as capstan wheels 50, for guiding movement of the tape 16 and/or for tensioning the tape 16.

The tape drive unit 14 further includes one or more tape roller servo subsystems for controlling one or more of the tape rollers 46, 48 and/or 50 to accurately control tension and position of the tape 16 with respect to the head assembly 12. For example, the tape drive unit 14 may include a supply reel servo subsystem for the supply reel 46, a take-up reel servo subsystem for the take-up reel 48, and a wheel servo subsystem for each capstan wheel 50.

In the embodiment shown in FIG. 1, the tape drive unit 14 includes a tape roller or reel servo subsystem 52 that controls both the supply reel 46 and the take-up reel 48 so that the reels may act in unison to provide smooth movement of the tape 16 along the tape path. The tape roller servo subsystem 52 may also be configured to control the capstan wheels 50.

Referring to FIGS. 1 and 7, the tape roller servo subsystem 52 includes a supply reel motor 54 associated with the supply reel 46, a take-up reel motor 56 associated with the take-up reel 48, and a motor controller 58 for controlling operation of the motors 54 and 56. The tape roller servo subsystem 52 further includes one or more amplifiers 60 for amplifying control signals provided by the controller 58, and one or more motor resolvers or encoders 62 for providing feedback signals that are indicative of relative linear position of the tape 16. For example, each motor encoder 62 may comprise a sensor, such as a photo detector or magnetic detector, for measuring or otherwise sensing motor shaft speed of a respective motor 54, 56 to thereby determine or sense relative position of the tape 16. Each motor encoder 62 may then provide a tape position error or feedback signal, such as a voltage signal, that is representative of tape position.

The tape position feedback signals may be used in a control loop of the tape roller servo subsystem 52, such that the motor controller 58 may control operation of the motors 54 and 56 based, at least in part, on the tape position feedback signals. In the embodiment shown in FIG. 7, the lens position feedback signals from one or more laser tracking servo subsystems 34 are also provided as inputs to the control loop of tape roller servo subsystem 52, such that the motor controller 58 may also control operation of the motors 54 and 56 based, at least in part, on the lens position feedback signals. For example, the tape position feedback signals may be used as primary inputs to the motor controller 58, while the lens position feedback signals can be used as secondary inputs to the motor controller 58. In such an example, course linear positioning of the tape 16 may be controlled based on the tape position feedback signals, while fine linear positioning of the tape 16 may be controlled based on the lens position feedback signals. In one embodiment, lens position feedback signals from all of the laser tracking servo subsystems 34 are provided as inputs to the tape roller servo subsystem 52.

In a further refinement, the tape roller servo subsystem 52 may control linear position of the tape 16 based, at least in part, on rate of change of the lens position feedback signals. For example, the motor controller 58 may receive consecutive lens position feedback signals from a particular laser tracking servo subsystem 34, determine a rate of change of the lens position feedback signals, and then control operation of one or more of the motors 54, 56 based on the rate of change.

Referring to FIGS. 1 and 7, a method of controlling movement of the tape 16 in the system 10 will now be described. Generally, the method may involve generating one or more lens position error or feedback signals at one or more of the OPU's 28. For example, as explained above, each photo detector 44 may be configured to detect laser light that is reflected off of the tape 16, and to generate a voltage signal that is indicative of the position of the associated lens 30 with respect to a prerecorded track or series of spots on the tape 16 that is used for tracking purposes. For each signal, the amplitude may be proportional to the distance of the associated lens 30, or corresponding reflected laser spot, from a particular track centerline, for example.

The method may further involve receiving one or more lens position feedback signals at the tape roller servo subsystem 52 from one or more of the laser tracking servo subsystems 34. In addition, the method involves controlling movement of the tape 16 by the tape roller servo subsystem 52 based, at least in part, on the one or more lens position feedback signals. For example, the one or more lens position feedback signals may be introduced into the control loop of the tape roller servo subsystem 52, along with one or more tape position feedback signals.

Under the above approach, tracking information or signals from the head assembly 12 may be fed directly into the servo control function driving the tape reels 46 and 48, for example. As a result, a direct link may be provided between laser spots of the lenses 30 and a track on the tape 16, such that the position of the tape 16 may be precisely clocked to the rotation of the head assembly 12.

The system and method of the present disclosure may therefore provide improved control of the linear movement of the tape 16, to thereby facilitate or enhance data recording and/or retrieval operations. Such improved control may be particularly beneficial when the difference between the relative speeds of the tape 16 and the head assembly 12 is quite large. For example, typical linear speed of the tape 16 may be in the range of 0.1 to 2 inches/second, while typical rotational speed of the head assembly 12 may be in the range of 5,000 to 15,000 revolutions per minute (rpm). As another example, a 4 inch diameter head assembly 12 with 30 OPU's 28 rotating at 10,000 rpm may use a tape speed of less than 0.125 inches/second.

Additional details of a data and storage retrieval system having a rotatable head assembly may be found in U.S. Pat. No. 8,225,339, which is hereby incorporated by reference in its entirety.

While certain embodiments of a data storage and retrieval system and method utilizing a tape media and a rotary head have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A method of controlling movement of a tape in a data storage and retrieval system having a tape roller servo subsystem for controlling movement of the tape, and a head servo subsystem for controlling position of a head element movably mounted on a rotatable carriage unit, the method comprising:
   receiving, from the head servo subsystem, a head element position feedback signal at the tape roller servo subsystem; and
   controlling movement of the tape by the tape roller servo subsystem based, at least in part, on rate of change of the head element position feedback signal;
   wherein the head servo subsystem is operable to radially position the head element with respect to the rotatable carriage unit by moving the head element with respect to the carriage unit.

2. The method of claim 1 wherein the head servo subsystem is operable to vertically position the head element with respect to the rotatable carriage unit.

3. The method of claim 1 wherein the head element includes a lens that transmits laser light to the tape, and the head element position feedback signal is generated by a detector that detects the laser light reflected off of the tape.

4. The method of claim 1 wherein the controlling step comprises controlling linear movement of the tape.

5. The method of claim 1 wherein the tape roller servo subsystem includes a tape roller motor, a tape roller motor controller for controlling the tape roller motor, and a tape roller motor encoder, and wherein the controlling step includes controlling the tape roller motor by the tape roller motor controller based, at least in part, on a tape position feedback signal received by the tape roller motor controller from the tape roller motor encoder.

6. The method of claim 5 wherein the tape position feedback signal is part of a primary control loop for the tape roller servo subsystem, and the head element position feedback signal is used to augment the primary control loop.

7. The method of claim 1 wherein the tape roller servo subsystem is used to control a tape reel.

8. The method of claim 1 wherein the taper roller servo subsystem is used to control a tape guide member or a tape tensioning member.

9. The method of claim 1 wherein the head element is mounted on a support arm that is translatable and pivotable with respect to the carriage unit, and wherein the head element is movable vertically relative to the carriage unit through translational movement of the support arm, and the head element is movable radially relative to the carriage unit through pivotal movement of the support arm.

10. A data storage and retrieval system comprising:
    a head assembly including a rotatable carriage unit and multiple head elements mounted on the carriage unit such that the head elements are each movable with respect to the carriage unit;
    a head servo subsystem for controlling position of at least one of the head elements; and
    a tape drive unit for moving a tape past the carriage unit, the tape drive unit including a tape roller and a tape roller servo subsystem for controlling movement of the tape roller, the tape roller servo subsystem including a tape roller motor associated with the tape roller and a tape roller motor controller for controlling operation of the tape roller motor;
    wherein the head servo subsystem is configured to provide a head element position feedback signal to the tape roller servo subsystem, and the tape roller servo subsystem is configured to control movement of the tape roller based, at least in part, on the head element position feedback signal, and wherein the carriage unit is rotatable about an axis that is generally perpendicular to the tape when the tape is positioned adjacent the carriage unit, and the head servo subsystem is operable to radially position the at least one head element with respect to the axis.

11. The system of claim 10 wherein the tape roller servo subsystem is configured to control movement of the tape based, at least in part, on rate of change of the head element position feedback signal.

12. The system of claim 10 wherein the head servo subsystem is operable to vertically position the at least one head element with respect to the rotatable carriage.

13. The system of claim 10 wherein the at least one head element includes a lens configured to transmit laser light to the tape, the head servo subsystem includes a detector that is configured to detect laser light reflected off of the tape and to generate the head element position feedback signal, and the head servo subsystem further includes at least one actuator configured to control movement of the lens relative to the carriage unit based at least in part on the head element position feedback signal.

14. The system of claim 10 wherein the tape roller servo subsystem further comprises a tape roller motor encoder that is configured to provide a tape position feedback signal to the tape roller motor controller, wherein the tape roller servo subsystem is configured to control movement of the tape based, at least in part, on the tape position feedback signal.

15. The system of claim 10 wherein the carriage unit is disk-shaped and the at least one head element is configured to write arc-shaped data tracks on the tape.

16. The system of claim 10 wherein the at least one head element is mounted on a support arm that is translatable and pivotable with respect to the carriage unit, and wherein the at least one head element is movable vertically relative to the carriage unit through translational movement of the support arm, and the at least one head element is movable radially relative to the carriage unit through pivotal movement of the support arm.

17. The system of claim 16 further comprising a first actuator for pivoting the support arm relative to the carriage unit, and a pair of second actuators for moving the support arm vertically relative to the carriage unit, wherein the first actuator is disposed radially outwardly of the support arm, and the second actuators are disposed on opposite sides of the support arm.

18. A method of controlling movement of a tape in a data storage and retrieval system having a tape reel servo subsystem and a laser tracking servo subsystem, wherein the laser tracking servo subsystem is operable to position a lens relative to a rotatable carriage unit to perform read and/or write operations on the tape as the tape moves linearly relative to the carriage unit, the method comprising:
receiving, from the laser tracking servo subsystem, a lens position feedback signal at the tape reel servo subsystem;
controlling linear movement of the tape by the tape reel servo subsystem based, at least in part, on the feedback signal; and
positioning the lens based, at least in part, on the feedback signal;
wherein the carriage unit is rotatable about an axis that is generally perpendicular to the tape when the tape is positioned adjacent the carriage unit, the laser tracking servo subsystem is operable to radially position the lens relative to the axis, the lens is mounted on a support arm that is movably mounted at an end of an elongated housing supported by the carriage unit such that the support arm is translatable and pivotable with respect to the housing, the lens is movable vertically relative to the housing through translational movement of the support arm, and the lens is movable radially relative to the housing through pivotal movement of the support arm.

19. A data storage and retrieval system comprising:
a head assembly including a rotatable carriage unit and multiple head elements mounted on the carriage unit such that the head elements are each movable with respect to the carriage unit, wherein each head element is mounted on a support arm that is translatable and pivotable with respect to the carriage unit, and wherein each head element is movable vertically relative to the carriage unit through translational movement of the respective support arm, and each head element is movable radially relative to the carriage unit through pivotal movement of the respective support arm;
a head servo subsystem for controlling the position of at least one of the head elements; and
a tape drive unit for moving a tape past the carriage unit, the tape drive unit including a tape roller and a tape roller servo subsystem for controlling movement of the tape roller, the tape roller servo subsystem including a tape roller motor associated with the tape roller and a tape roller motor controller for controlling operation of the tape roller motor;
wherein the head servo subsystem is configured to provide a head element position feedback signal to the tape roller servo subsystem, and the tape roller servo subsystem is configured to control movement of the tape roller based, at least in part, on rate of change of the head element position feedback signal.

20. A method of controlling movement of a tape in a data storage and retrieval system having a tape roller servo subsystem for controlling movement of the tape, and a head servo subsystem for controlling position of a head element movably mounted on a rotatable carriage unit, the method comprising:
receiving, from the head servo subsystem, a head element position feedback signal at the tape roller servo subsystem; and
controlling movement of the tape by the tape roller servo subsystem based, at least in part, on the head element position feedback signal;
wherein the carriage unit is rotatable about an axis that is generally perpendicular to the tape when the tape is positioned adjacent the carriage unit, the head servo subsystem is operable to radially position the head element with respect to the axis by moving the head element with respect to the carriage unit, the head element is mounted on a support arm that is translatable and pivotable with respect to the carriage unit, the head element is movable vertically relative to the carriage unit through translational movement of the support arm, and the head element is movable radially relative to the carriage unit through pivotal movement of the support arm.

* * * * *